Patented Aug. 12, 1941

2,252,554

UNITED STATES PATENT OFFICE 2,252,554

POLYMERIC MATERIAL

Wallace Hume Carothers, deceased, late of Wilmington, Del., by the Wilmington Trust Company, Wilmington, Del., executor, assignor to E. I. du Pont de Nemours & Company, Wilmington, Del., a corporation of Delaware No Drawing. Application September 19, 1938, Serial No. 230,724

14 Claims. (Cl. 260—78)

This invention relates to synthetic polymeric materials, and more particularly to synthetic linear interpolyamides.

This application is a continuation-in-part of U. S. P. 2,130,948, filed April 9, 1937, which is a continuation-in-part of application Serial Number 74,811 now U. S. P. 2,190,770, filed April 16, 1936. This application also is a continuation-in-part of application Serial Number 91,617, filed July 20, 1936 and since abandoned, and of application Serial Number 125,889, filed February 15, 1937, now U. S. P. 2,188,332.

This application is concerned with certain of the interpolyamides described in the above mentioned applications. For a better understanding of the present invention, reference may be had first to the simple polyamides derived from the reaction of a single diamine with a single dibasic acid or from the polymerization of a single amino acid, this latter type of polyamide being described in Patent 2,071,253. These polyamides are characterized by high melting point, pronounced crystallinity, and insolubility in most solvents except mineral acids, formic acid, and the phenols. They yield filaments capable of being cold drawn, that is drawn below their melting point, into fibers showing upon X-ray examination orientation along the fiber axis. The same properties which are advantageous for the manufacture of fibers, however, make it difficult to prepare clear sheets from these polyamides or to use the polyamides in coating compositions and other compositions which require the use of a solvent. Acids and phenols cannot be used advantageously as solvents in coating compositions and the like.

Of the interpolyamides described in the above mentioned application those prepared from three components, e. g. two diamines and on dibasic acid, or one diamine and two dibasic acids, although they have lower melting points than the simple polyamides, do not have the wide solubility and compatibility characteristics of the four-component interpolyamides which are also described in that application and which form the subject matter of the present claims. Except for their lower melting points the three-component interpolymers more closely resemble the simply polyamides than they do the four-component interpolymers. Interpolymers prepared from more than four components resemble the four-component interpolymers.

This invention has as an object the preparation of new fiber-forming polymers. A further object is to prepare from diamines and dibasic acids interpolyamides having wider solubility characteristics, lower melting points, and less pronounced crystallinity than the "simple" polyamides. A still further object is the preparation of useful articles from these polymers. Other objects will appear hereinafter.

These objects are accomplished by heating to reaction temperature at least four polyamide-forming reactants, at least one of which is a diprimary diamine and at least one other of which is a dicarboxylic acid or an amide-forming derivative of a dibasic carboxylic acid, the amine and acid reactants being used in substantially equimolecular proportions, until a polymeric product is obtained which is capable of being formed into continuous filaments.

By the term "polyamide-forming reactants" is meant diamines having at least one hydrogen atom on each amino group, dicarboxylic acids, amide-forming derivatives of dibasic carboxylic acids, polymerizable monoaminomonocarboxylic acids, and amide-forming derivatives of monoaminomonocarboxylic acids, including caprolactam. A salt of a diamine and a dibasic acid will be considered as representing two polyamide-forming reactants.

By "substantially equimolecular proportions" of acid and amine reactants is meant that not more than 5 molar per cent excess of either reactant is employed. In other words, the reaction mixture must not contain substantially more than 5% excess of either amino or acid groups or their equivalents.

Through the practice of this invention the above drawbacks of the simple polyamides can be overcome without sacrificing such desirable properties as good thermal stability, strength, and pliability by preparing the polyamides from a mixture of at least four polyamide-forming reactants, preferably two diamines and two dibasic acids. These products, which will be referred to herein as interpolymers or more specifically as interpolyamides, have much lower melting points than the corresponding simple polyamides and are less crystalline. This lower crystallinity is evidenced by the following facts: (1) X-ray diagrams of the interpolymers show a fainter crystalline pattern than in the case of the simple polyamides, (2) the interpolymers are more resinous in character than the simple polymers, (3) melt over a wider range, (4) and give clearer films, i. e. films in which the crystallinity is much less apparent. Another difference between the interpolyamides and the simple polyamides is that cold drawn filaments of the former tend to retract when heated at temperatures considerably below their melting points. This property gives the interpolyamides interesting felting qualities. The interpolymers are further characterized by greater solubility in organic solvents. In addition to being soluble in formic acid and the phenols, the solvents for the simple polyamides, the interpolymers are soluble in alcohols, particularly when hot, and in alcohol-chlorinated hydrocarbon mixtures. They are also soluble in unsaturated alcohols, e. g. methallyl alcohol and methyl ethyl ethynyl carbinol. In addition to being more soluble than the simple polyamides, the interpolyamides possess a wider range of compatibility with most modifying agents, e. g. plasticizers and resins. These characteristics, together with inherent toughness, make these interpolyamides especially valuable in the preparation of sheet materials and coating compositions.

In the preferred practice of this invention two diamines and two dicarboxylic acids are amide-forming derivatives of dibasic carboxylic acids (ester, half-ester, acid halide, anhydride, or amide), the amine and acid reactants being present in substantially equimolecular amounts, are heated at amide-forming temperatures, generally in the range of 120°–300° C., until the product has a sufficiently high molecular weight to exhibit fiber-forming properties. As in the case of the simple polyamides, the fiber-forming stage can be tested for by touching the molten polymer with a rod and drawing the rod away; if this stage has been reached a continuous filament of considerable strength and pliability is formed. This stage is generally reached when the polyamide has an intrinsic viscosity of at least 0.4, where intrinsic viscosity is defined as $$\frac{\log_e \eta_r}{C}$$

in which $\eta_r$ is the viscosity of a dilute solution of the polymer in m-cresol divided by the viscosity of m-cresol in the same units and at the same temperature (e. g., 25° C.); and C is the concentration in grams of polymer per 100 cc. of solution. In general, measurement of the intrinsic viscosity will be the most convenient method for following the course of the reaction to determine when the desired degree of polymerization has been attained. The interpolymers of this invention do not acquire the properties desired for most uses until they have reached the fiber-forming stage. In other words, great strength, toughness, pliability, etc., are properties which go hand in hand with the fiber-forming property.

In general, the interpolymers are prepared most economically from diamines and dicarboxylic acids. The reactants are conveniently mixed in the form of their salts since the salts are crystalline and can be readily purified. Instead of making a mixed salt using all four reactants, it is generally preferable to prepare two simple salts each prepared from one diamine and one dicarboxylic acid and to use the mixture of the salts in the polymerization reaction. This method of preparation is illustrated in the subsequent examples.

The conversion of a mixture of the diamine-dibasic acid salts to the interpolyamide is carried out in the same manner as the preparation of simple polyamides from a single diamine-dibasic acid salt as described in the application previously referred to. The reaction is carried out by heating the salts at amide-forming temperatures, generally between 180° and 300° C., in the presence or absence of a diluent and under conditions which will permit the water formed in the reaction to escape, at least during the last stages of the reaction, until examination of a test portion of the product indicates that it has the desired fiber-forming properties. As examples of solvents which may be used in the reaction may be mentioned phenol, the cresols, the xylenols, diphenylolpropane, and o-hydroxy-diphenyl. White medicinal oil is an example of a non-solvent which may be used. The reaction can also be carried out in the presence of water during the first stage as indicated in subsequent Examples I–III.

The polyamides of this invention can be prepared in a similar manner by reacting a mixture of diamines and amide-forming derivatives of dibasic carboxylic acids. In some instances, e. g. in the case of aryl esters of the dibasic acid, the polymerization reaction starts at a lower temperature than in the case of the free acid or salt, sometimes as low as 50° C.

The polymerization reaction whereby the interpolymers of this invention are made can be carried out at atmospheric, superatmospheric, or subatmospheric pressure. Except when the aryl esters of the dibasic acids are used, in which case the by-product is a phenol, the last stages of the reaction, at least, should be carried out under conditions which permit the escape of the by-product of the reaction. This is generally done by operating at atmospheric or reduced pressure during the last stages of the reaction. Preferably the reaction is carried out in the absence of oxygen, e. g. in an atmosphere of nitrogen, or in a vacuum. An antioxidant may be added if desired.

Products of this invention are synthetic linear polyamides. The amide groups in these polyamides form an integral part of the main chain of atoms in the polymer. On hydrolysis with hydrochloric acid the polyamides revert to the reactants from which they were prepared. In other words, an interpolyamide derived from two diamines and two dibasic acids will yield on hydrolysis with hydrochloric acid a mixture comprising two diamine hydrochlorides and two dibasic acids.

The following examples, in which parts are by weight, are illustrative of the preparation and application of the products of this invention.

EXAMPLE I

A mixture of 393 parts of hexamethylene diammonium adipate (M. P. 183°–184° C.), 560 parts of decamethylene diammonium sebacate (M. P. 178°–180° C.), and 200 parts of water was placed in a stainless steel autoclave. Air was removed from the system by evacuation, followed by filling the free space with oxygen-free nitrogen and evacuating again. The autoclave was then heated to 265° C. during 1.5 hours. When a pressure of 250 lbs. per sq. in. was reached in the autoclave, water vapor was bled off at such a rate that the pressure was maintained at 250 lbs. per sq. in. After 2.75 hours' heating at this pressure, the pressure was reduced to atmospheric during the course of 0.5 hour and finally the autoclave was evacuated slowly (0.5 hour) to 100 mm. After cooling, the interpolyamide was removed from the autoclave as an opalescent pseudoresinous solid. It had an intrinsic viscosity of 1.1 and a pentrometer softening point of 136° C. On a heated metal block fibers of the interpolymer melted over the range 135°–140° C. The interpolymer was soluble in formic acid, phenol, and in hot glacial acetic acid. Unlike either polyhexamethylene adipamide or polydecamethylene sebacamide, the interpolyamide was soluble in hot butanol and in mixtures of alcohols with chlorinated hydrocarbons, such as methanol - chloroform, methanol-1-chloro-2,2'-dichloroethane, and methanol-trichloroethylene mixtures. Unsaturated alcohols, such as methallyl alcohol, were also good solvents for the interpolymer. The interpolymer could be spun into filaments which on cold drawing yielded oriented fibers of good strength. Filaments spun from melt and cold drawn 450% had a tenacity of 4.4 g. per denier and a residual elongation of 57%. Films prepared from the interpolymer had a tensile strength of about 8000 lbs. per sq. in. based on original dimensions. Cold rolling these films improved their toughness.

Products possessing properties intermediate between those of the simple polyamides and the above interpolyamides were obtained by using varying amounts of the two diamine-dibasic acid salts mentioned above; namely, hexamethylene diammonium adipate and decamethylene diammonium sebacate. The melting point-composition curve for this system passes through a minimum. Clarity and ease of solubility also increase as the composition of the interpolymer approaches that possessed by the minimum melting product. Table I gives the melting point, as determined for small particles (fibers) on a heated metal block in air, for fiber-forming polymers prepared from various proportions of these two salts.

TABLE I

*Melting points of various hexamethylene adipamide-decamethylene sebacamide interpolymers*

| Hexamethylene adipamide* | Decamethylene sebacamide* | Melting point, °C |
|---|---|---|
| 0 | 100 | 199–200 |
| 20 | 80 | 150–152 |
| 40 | 60 | 136–138 |
| 41.2 | 58.8 | 135–140 |
| 50 | 50 | 142–145 |
| 60 | 40 | 164–166 |
| 80 | 20 | 207–209 |
| 100 | 0 | 248–249 |

*Parts by weight of corresponding salt employed.

EXAMPLE II

A mixture of 75 parts of hexamethylene diammonium adipate, 75 parts of heptamethylene diammonium pimelate (M. P. 163°–164° C.), and 50 parts of water was placed in an autoclave. Air was removed from the system as described in Example I and then the autoclave was heated to 255° C. during 1.5 hours. Water vapor was bled off at such a rate as to maintain a pressure of 160 lbs. per sq. in. for about 0.75 hour. The pressure was then reduced to atmospheric during 0.5 hour and finally the autoclave was evacuated slowly (0.6 hour) to about 100 mm. The polymerization was completed by maintaining the autoclave at this pressure for 0.5 hour. The molten interpolyamide was then removed from the autoclave by extrusion under pressure through a slot orifice. The molten polymer coming from the autoclave flowed through an 0.25 inch air space into a water trough where it solidified and was carried under constant tension by a pair of take-off rolls placed about 7 inches below the surface of the water. The ribbon thus obtained was very transparent, tough, and quite pliable. The melting point of the interpolymer in fiber form was 155°–157° C. The interpolymer had an intrinsic viscosity of 1.06. Like the interpolyamide of Example I, it could be formed into filaments and sheets whose utility was improved by cold drawing or cold rolling. The interpolymer was soluble in phenols, formic acid, glacial acetic acid, and mineral acids. It was also soluble in alcohols and related compounds, and in mixtures of alcohols and chlorinated hydrocarbons.

EXAMPLE III

Following the general methods described in the preceding examples, a mixture of 192 parts of hexamethylene diammonium adipate, 192 parts of 2,5-dimethylhexamethylene diammonium alpha-alpha'-dimethyl adipate (M. P. 158°–160° C.), and 100 parts of water was heated at 250° C. in an autoclave with removal of water during the last stages of the reaction. The resultant interpolymer was formed into a clear, uniform ribbon by the method described in Example II. The interpolymer had an intrinsic viscosity of 0.88 and a melting point in fiber form of 128°–130° C. Its solubility characteristics were similar to that of the products of the preceding examples, but this interpolymer was somewhat more soluble in alcohols and related compounds, e. g. ethers of ethylene glycol. This increased solubility as well as the low melting point can be attributed to the branched chain nature of the two ingredients.

EXAMPLE IV

A mixture of 5 parts of hexamethylene diammonium adipate and 5 parts of decamethylene diammonium p,p'-isopropylidene bis-phenoxyacetate, the salt derived from decamethylene diamine and

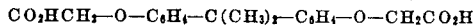

(M. P. 222°–224° C.) was heated in a closed vessel for 2 hours at 240°–260° C. The low polymer thus obtained was heated for 2 hours more at 240°–260° C. under a pressure of 2 mm. The product thus obtained was a very tough, pseudoresinous, transparent polymer. It had an intrinsic viscosity of 1.1 and could be spun into filaments which were capable of being cold drawn into strong fibers. The interpolymer melted at 155°–157° C. Molded films of this material were quite clear and pliable. The interpolymer had the same solubility characteristics as the preceding interpolymers, being soluble in alcohols, alcohol-chlorinated hydrocarbon mixtures, ethers of ethylene glycol, and related compounds besides the customary simple polyamide solvents, such as phenols, formic acid, and mineral acids.

EXAMPLE V

A mixture of 6 parts of hexamethylene diammonium adipate and 4 parts of decamethylene diammonium isophthalate (M. P. 220°–222° C.) was heated in an evacuated tube for 2 hours at 210°–230° C. The tube was then opened and heated for 2 hours more at 230°–250° C. under a pressure of 2 mm. The interpolymer thus obtained was a clear, pseudoresinous solid which melted at 145°–148° C. (in fiber form). The interpolymer was soluble in alcohols and related compounds as well as in the usual polyamide solvents. It had an intrinsic viscosity of 0.73 and could be spun into filaments capable of being cold drawn into oriented fibers. Films, sheets, etc. of the material were quite tough, transparent, and pliable. Cold rolling on an even speed mill increased the toughness of these products.

EXAMPLE VI

A mixture of 5 parts of hexamethylene diammonium adipate, 4 parts of hexamethylene diammonium sebacate (M. P. 165°–167° C.), and 1 part of hexamethylene diammonium p,p'-isopropylidene bis-phenoxyacetate (M. P. 238°–240° C.) was heated in a closed vessel for 2 hours at 250°–260° C. The vessel was then evacuated to 2 mm. and the heating continued for 2 hours more at 250°–260° C. The hard, bone-like interpolyamide thus obtained had an intrinsic viscosity of 1.05. It melted at 180°–185° C. and was soluble in alcohols and the usual polyamide solvents. Filaments spun from the interpolymer were susceptible to cold drawing. Sheets prepared from the product were clear, pliable, and tough, particularly when prepared under quenching conditions and subsequently cold rolled.

It will be apparent that an almost unlimited number of interpolymers can be prepared in accordance with the process of this invention, since the number of combinations possible is very large. In Table II are given the melting points of a number of typical fiber-forming, four-component interpolymers, prepared by copolymerization of the salts indicated.

Although interpolymers prepared from more than four components are characterized by the same general properties as the four-component interpolymers, the four-component interpolymers constitute the preferred embodiment of the invention, since too great a number of reactants complicates the problem of securing equivalency of diamines and dibasic acids. Furthermore, for economic reasons it is desirable to limit the number of reactants as much as possible. However, when mixed acids are used, e. g. the mixture of azelaic and suberic acids obtained from the oxidation of oleic acid or the mixture of undecandioic and dodecandioic obtained from the oxidation of hydrogenated castor oil, it is frequently more convenient to prepare interpolymers containing more than four components. For example, the salt obtained from reaction of a mixture of azelaic and suberic acids with a mixture of octamethylene and nonamethylene diamines on heating with hexamethylene diammonium adipate gives an interpolymer in which six components are represented.

Of the four-component interpolymers those derived from two diamines and two dibasic acids are preferred. As indicated in the examples, these products are readily obtained by copolymerizing two diamine-dibasic acid salts. The preferred reactants for the preparation of interpolymers are diamines of formula $NH_2CH_2R-CH_2NH_2$ and dicarboxylic acids of formula $HOOCCH_2R'CH_2COOH$ in which R and R' are

TABLE II

*Four-component interpolyamides*

| Derived from— | | Weight ratio of salt I to salt II | Melting range, °C. |
|---|---|---|---|
| Salt I (D=diammonium) | Salt II (D=diammonium) | | |
| Hexamethylene D. adipate | Decamethylene D. brassylate | 50:50 | 205–210 |
| Do | Pentamethylene D. glutarate | 60:40 | 148–150 |
| Do | Pentamethylene D. sebacate | 50:50 | 155–157 |
| Do | Pentamethylene D. azelate | 50:50 | 148–150 |
| Do | Heptamethylene D. pimelate | 50:50 | 155–157 |
| Do | Octamethylene D. suberate | 50:50 | 160–165 |
| Do | Nonamethylene D. azelate | 50:50 | 140–145 |
| Do | do | 25:75 | 115–118 |
| Do | Decamethylene D. dodecanedioate | 50:50 | 150–155 |
| Do | 3-ter-butyl-hexamethylene D. β-ter-butyladipate | 50:50 | 115–118 |
| Do | Decamethylene D. isophthalate | 70:30 | 160–165 |
| Do | m-Phenylene D. sebacate | 60:40 | 122–127 |
| m-Phenylene D. sebacate | Decamethylene D. isophthalate | 80:20 | 180–185 |

Instead of preparing the interpolymers of this invention from monomeric reactants as illustrated in the foregoing examples, they can also be prepared from simple polyamides. This can be done by heating two or more different simple polyamides with water or alcohol under pressure, preferably at a temperature between 180° and 300° C. Under these conditions partial hydrolysis of the polyamides occurs with the formation of low polyamides and some monomeric reactants, the extent of the hydrolysis depending upon the temperature and the quantity of water or other hydrolytic agent used. The water or other hydrolytic agent is then permitted to escape, preferably at a temperature sufficiently high to keep the reaction mass fluid, and the heating is continued at amide-forming temperatures. This causes the hydrolysis products (chiefly low polyamides) to reunite and in so doing they form an interpolymer. This method, which is also useful in blending two samples of the same simple polyamide, serves as a means for recovering waste or scrap polymer.

divalent hydrocabron radicals and in which R has a chain length of at least two carbon atoms. Preferably R and R' are methylene or polymethylene groups. However aromatic reactants, e. g. m-phenylenediamine and isophthalic acid, are useful ingredients if a high-melting interpolymer is desired. In preparing interpolymers from aromatic diamines it is frequently desirable to react the diamine with an excess of dibasic acid or acids, preferably two moles of acid for each mole of amine, and then to react this intermediate with the required amount of aliphatic diamine or diamines to bring about equivalency of amino and acid groups. This procedure is recommended in the case of aromatic diamines because they react more slowly than aliphatic diamines.

It should be understood that the interpolymers are not limited to those prepared solely from diamines and dicarboxylic acids. If desired, modifying agents such as plasticizers, pigments, resins, delusterants, etc. may be added before, during or after the polymerization. It is also within the scope of the invention to add to the polyamide-forming reactants other polymer-forming reactants, e. g. hydroxyacids and glycols. Polymerizable monoamino-monocarboxylic acids, e. g. 6-aminocaproic acid, and amide-forming derivatives thereof, e. g. caprolactam, may also be used in preparing the interpolymers.

For certain purposes it is desirable that the interpolymers be viscosity-stable, i. e. do not alter appreciably in viscosity (molecular weight) when heated at their melting points. Viscosity-stable interpolymers can be prepared by using a small excess (up to 5 molar per cent) of the diamine or dibasic acid reactants or by incorporating in the reaction mixture a small amount, generally 0.1 to 5% of a monoamine or a monocarboxylic acid or derivative thereof. Acetic acid and stearic acid are typical viscosity stabilizers of this class.

The products of this invention can be employed in the preparation of fibers for use in the textile art; e.g. in the preparation of knitted, woven, and pile fabrics. Interpolyamides particularly useful for the preparation of filaments for use in textiles are those having melting points above 200° C. and preferably above 225° C. which may be obtained by the use of relatively small quantities of two of the components of the interpolymer. For example, interpolyamides based primarily upon polyhexamethylene adipamide are most suitable for use as textile fibers when the interpolyamide contains 80 or more per cent of the polyhexamethylene adipamide. These polymers are somewhat easier to spin than the simple polyamides since they decompose only very slowly at temperatures required to keep them molten, are less sensitive to oxygen at the temperature required for their manipulation, and yet are sufficiently high melting to withstand temperatures of ironing customarily employed on fabrics. Like the simple polyamides, the interpolyamides can be spun from melt or from solution by the wet or dry process. Because of the solubility of certain of these materials in alcohols, unsaturated alcohols, alcohol-halogenated hydrocarbon mixtures, and other low-boiling solvents, the interpolymers are more suitable for spinning from solution than the simple polyamides.

Interpolyamide fibers, like fibers made from simple polyamides, can be used in the preparation of yarns, metallized yarns, lastex-type yarns, threads, ropes, braided cords, crepe fabrics, organdies, and impregnated, laminated, or composite fabrics. The laminated fabrics, e. g. for cuffs and collars can be made by securing between two layers of high-melting or infusible fabric a fabric or sheet composed of or impregnated with interpolyamide and then laminating the product by applying sufficient heat and pressure to cause the interpolymer to soften. The polyamide fabrics, sheets, etc., can also be embossed. Since polyamides are fusible, pieces of polyamide fabric can be combined by means of heat, i. e. by "seam welding." If desired, agents can be incorporated in the fabric which undergo some change, e. g., a color change, at a temperature slightly below the melting point of the polymer to act as a warning agent in ironing.

By reason of the fact that cold-drawn filaments of certain of the lower melting interpolyamides tend to retract when heated, they are useful in making felted articles. Thus, when cold-drawn interpolyamide filaments or staple fibers, particularly those melting in the range of 130°-170° C., are mixed with other fibers, e. g. cotton, rayon, or other polyamides, in the form of yarns, sheets, fabrics, webs, matrix, or the like, and the mixture is heated, the retraction of the interpolymer filaments or fibers has a felting action on the mixture.

Fibers of interpolyamides are also useful in the preparation of many specialty cloths where severe wear or abrasion is encountered or where high tensile strength both wet and dry is required; for example, in the preparation of sail cloth, airplane wing fabric, typewriter ribbons, tracing cloth, belting, camera bellows, filter cloths, mothproof bags, laundry and other bags, steam and fire hose, gasket fabrics and gear fabrics for molded gears, surgical dressings, tapes, and stencil screens for decorating glass. Other uses for fibers in suitable form include packings for stuffing boxes, fish nets, hair nets, artificial hair, security paper, and windings for baseballs. The fibers may be long or short, solid or hollow, and may be combined with other types of fibers. In the form of crimped fibers, the interpolyamides are useful in making cashmere, worsted suitings, blankets, down and feather substitutes, and the like.

Owing to the great toughness, pliability, and good clarity of the sheet materials prepared from interpolyamides, they are especially useful in this form, particularly after they have been cold rolled. Typical uses for this form are wrapping foil, metalized foils, and casings for sausage and other foods. As in the case of simple polyamides, the sheets are also useful in making leather substitutes, tile substitutes, gaskets, washers, drinking straws, i. e. spiral tubes, goggles, windshields, glass and isinglass substitutes, diaphragms for loud speakers, etc., raincapes, lamp shades, umbrellas, hats, translucent picture projection screens, transfer picture base, fiber board substitutes, membranes for musical drums, dialyzing membranes, substitutes for gold beaters skin, collapsible tubes for soaps, etc., bottle caps, shoe insoles, fan blades, airplane wings, heat insulation, belting, transparent straps, e. g. for women's underclothes, playing cards, table cloths, e. g. for card tables, printing blankets, acid and alkali shields, and window shades. The interpolyamides are also useful in the preparation of blown articles such as toys, hollow toilet ware, etc. Ribbons or strips of the interpolyamides are useful as whalebone substitutes, and as reeds for weaving chairs and baskets.

The good solubility characteristics of the interpolymers, together with their other desirable properties, make them useful as ingredients in coating and impregnating compositions. For example, the interpolymers can be used to coat paper, cloth, leather, linoleum, regenerated cellulose sheeting, bookbinding and other materials from melt or from solution. Coated cloth is particularly useful for upholstery and book cloth. The interpolyamides can be used as clear lacquers, e. g. as a coating over other finishes or directly as coatings for wood, metals, cement, etc. In the form of pigmented enamels or paints, they are useful as a general industrial finish, e. g. in coating machinery, ships, automobiles, houses, cans, printing plates, leather, etc. Interpolymers can also be used to coat food containers, and other materials which require a water-insensitive, oil- or alkali-resistant coating. A further use of polyamide coating compositions is for coating fruit and nursery stock. Rubber is another material to which polyamide coatings can be applied with goods results, e. g. in the preparation of gasoline hose (as a liner), rubberized cloth, raincoats, hospital sheeting, golf balls, coatings, etc. In the porous or blown form the interpolyamides can be used as cork or sponge substitutes. Further uses for the products of this invention are sizes for textiles and paper, shoe stiffeners, stiffeners for hats, flame retardants, impregnating agents for wood, modifying agents for paper pulp, modifying agents for lubricants, ingredient in insecticides, substitutes for glass in double windows, glazed chintz, and reliefs for printing.

It is understood that in all of the above uses the interpolymers may be admixed with other materials, e. g. plasticizers, pigments, resins, cellulose derivatives, and simple polyamides.

As many apparently widely different embodiments of this invention may be made without departing from the spirit and scope thereof, it is to be understood that the invention is not limited to the specific embodiments thereof except as defined in the appended claims.

What is claimed is:

1. A process which comprises heating at reaction temperature a polyamide-forming composition comprising at least four polyamide-forming reactants, at least one of which is a diprimary diamine and at least one other of which is a substance of the class consisting of dicarboxylic acids and amide-forming derivatives of dibasic carboxylic acids, the complementary amide-forming reactants in said polyamide-forming composition being present in substantially equimolecular proportions, and continuing said heating until a polymeric product is obtained which is capable of being formed into continuous filaments.

2. A process which comprises heating to reaction temperature at least two diprimary diamines and at least two different complementary amide-forming reactants selected from the class consisting of dicarboxylic acids and amide-forming derivatives of dibasic carboxylic acids, the amine and acid reactants being present in substantially equimolecular proportions, and continuing said heating until a polymeric product is obtained which is capable of being formed into continuous filaments.

3. A process which comprises heating two diprimary diamine-dibasic carboxylic acid salts derived from different diprimary diamines and dibasic carboxylic acids until a polymeric product is obtained which is capable of being formed into continuous filaments.

4. A polyamide capable of being formed into useful textile fibers, said polyamide being obtained by condensation polymerization from at least two diprimary diamines and at least two different complementary amide-forming reactants selected from the class consisting of dicarboxylic acids and amide-forming derivatives of dibasic carboxylic acids.

5. A synthetic linear polyamide having an intrinsic viscosity of at least 0.4, said polyamide yielding upon hydrolysis with hydrochloric acid a mixture comprising at least four polyamide-forming reactants, at least one of which is a diprimary diamine hydrochloride and at least one other of which is a dibasic carboxylic acid.

6. A synthetic polyamide capable of being formed into fibers showing by characteristic X-ray patterns orientation along the fiber axis, said polyamide upon hydrolysis with hydrochloric acid yielding a mixture comprising at least two diprimary diamine hydrochlorides and at least two dibasic carboxylic acids.

7. A synthetic polyamide having an intrinsic viscosity of at least 0.4, said polyamide being obtained by condensation polymerization from a mixture comprising at least two diamines of formula $NH_2CH_2RCH_2NH_2$ and at least two dicarboxylic acids of formula $HOOCCH_2R'CH_2COOH$ in which R and R' are divalent hydrocarbon radicals and in which R has a chain length of at least two carbon atoms.

8. A synthetic linear polyamide having an intrinsic viscosity of at least 0.4, said polyamide being obtained by condensation polymerization of hexamethylenediamine, decamethylenediamine, adipic acid, and sebacic acid.

9. The synthetic polyamide set forth in claim 5 wherein said diprimary diamine is an aromatic diamine.

10. A polyamide capable of being formed into useful textile fibers which comprises the reaction product of at least four polyamide forming reactants, whose complementary amide-forming constituents are present in substantially equimolecular proportions, at least one of which reactants is a diprimary diamine and at least one other of which reactants is a substance of the class consisting of dicarboxylic acids and amide-forming derivatives of dibasic carboxylic acids.

11. Filaments, ribbons, sheets, and the like comprising a synthetic interpolyamide, said interpolyamide being obtained by mutual polymerization of at least four polyamide-forming reactants whose complementary amide-forming constituents are present in substantially equimolecular proportions, at least one of which reactants is a diprimary diamine and at least one other of which reactants is selected from the class consisting of dicarboxylic acids and amide-forming derivatives of dibasic carboxylic acids.

12. A synthetic linear polyamide having an intrinsic viscosity of at least 0.4, said polyamide being obtained by condensation polymerization of hexamethylenediamine, heptamethylenediamine, adipic acid, and pimelic acid.

13. The polyamide set forth in claim 10 wherein at least 80 per cent of the said polyamide forming reactants consists of hexamethylene diamine and adipic acid in substantially equimolecular proportions.

14. The filaments, ribbons, sheets, and the like, set forth in claim 11 wherein at least 80 per cent of the said polyamide forming reactants from which the said interpolyamide is obtained consists of hexamethylene diamine and adipic acid in substantially equimolecular proportions.

WILMINGTON TRUST COMPANY,
*Executor of the Estate of Wallace Hume Carothers, Deceased,*
By ELWYN EVANS,
*Vice President.*